United States Patent
Choi

(10) Patent No.: US 8,068,191 B2
(45) Date of Patent: Nov. 29, 2011

(54) LIQUID CRYSTAL DISPLAY APPARATUS

(75) Inventor: Jae-Chang Choi, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 862 days.

(21) Appl. No.: 11/674,378

(22) Filed: Feb. 13, 2007

(65) Prior Publication Data

US 2008/0284940 A1    Nov. 20, 2008

(30) Foreign Application Priority Data

Feb. 21, 2006    (KR) .................. 10-2006-0016817

(51) Int. Cl.
*G02F 1/1333*    (2006.01)
(52) U.S. Cl. ........................................ 349/58; 349/60
(58) Field of Classification Search .............. 349/58, 349/60
See application file for complete search history.

(56) References Cited

U.S. PATENT DOCUMENTS

| | | | |
|---|---|---|---|
| 5,666,172 A * | 9/1997 | Ida et al. | 349/58 |
| 6,975,368 B2 * | 12/2005 | Lee | 349/58 |
| 7,004,614 B2 * | 2/2006 | Tsai et al. | 362/633 |
| 7,113,237 B2 * | 9/2006 | Nitto et al. | 349/58 |
| 2003/0234894 A1 * | 12/2003 | Lee | 349/58 |
| 2005/0018102 A1 * | 1/2005 | Hirano | 349/58 |
| 2006/0050481 A1 * | 3/2006 | You | 361/688 |

FOREIGN PATENT DOCUMENTS

KR    2002-0034214    12/2003

* cited by examiner

*Primary Examiner* — Phu Vu
(74) *Attorney, Agent, or Firm* — F. Chau & Associates, LLC

(57) ABSTRACT

A liquid crystal display apparatus includes a liquid crystal display panel, a mold frame, chassis and a strength-reinforcing member. The liquid crystal display panel displays an image. The mold frame receives the liquid crystal display panel. The chassis is combined with the mold frame to secure an end of the liquid crystal display panel, and includes a first side portion and a coupling hole formed at the first side portion. The strength-reinforcing member is disposed between the first side portion and the mold frame. As a result, a strength of the chassis may be improved, and the to liquid crystal display panel may be prevented from being damaged.

21 Claims, 5 Drawing Sheets

LIQUID CRYSTAL DISPLAY APPARATUS

CROSS-REFERENCE TO RELATED APPLICATIONS

This application relies for priority upon Korean Patent Application No. 2006-16817 filed on Feb. 21, 2006, the contents of which are herein incorporated by reference in their entirety.

BACKGROUND OF THE INVENTION

1. Technical Field

The present disclosure relates to a liquid crystal display apparatus, and more particularly, to a liquid crystal display apparatus capable of improving strength of a top chassis and preventing a liquid crystal display apparatus from being damaged.

2. Discussion of the Related Art

A liquid crystal display (LCD) apparatus displays an image by using liquid Crystal. The LCD apparatus has characteristics, for example, such as light weight, low power consumption, and low driving voltage. The LCD apparatus is used in a mobile display apparatus such as a notebook computer.

The LCD apparatus may include an LCD panel displaying an image, a backlight assembly providing light to the LCD panel, a mold frame receiving the LCD panel and the backlight assembly and a top chassis combined with the mold frame to secure an edge of the LCD panel.

The top chassis defines an outer shape of the LCD apparatus and prevents the LCD apparatus from being chemically or physically damaged. Furthermore, the top chassis may include a coupling hole formed at a side surface thereof for being combined with an external case using a screw.

In order to reduce weight of the top chassis in the notebook computer, the top chassis may include a light-weight material such as aluminum.

When a top chassis includes aluminum, some of the strength of the top chassis is sacrificed. As a result, the shape of the top chassis including aluminum may be deformed, and forming a tap for a screw to combine the top chassis with the external case is difficult. Therefore, a clip including a stainless material may be coupled to the mold frame combined with the top chassis.

However, an end portion of such a clip contacts an edge of the LCD panel so that the LCD panel can be damaged by external impact.

SUMMARY OF THE INVENTION

Embodiments of the present invention provide a liquid crystal display (LCD) apparatus capable of improving strength of a top chassis and preventing a liquid crystal display apparatus from being damaged.

In an embodiment of the present invention, an LCD apparatus includes an LCD panel, a mold frame, a chassis and a strength-reinforcing member. The LCD panel displays an image. The mold frame receives the LCD panel. The chassis is combined with the mold frame to secure an edge of the liquid crystal panel, and includes a first side portion and a coupling hole formed at the first side portion. The strength-reinforcing member is disposed between the first side portion and the mold frame.

The chassis may further include a second side portion longer than the first side portion. The strength-reinforcing member substantially corresponds to a whole side surface area of the first side portion of the chassis. Furthermore, the strength-reinforcing member includes a burring portion corresponding to the coupling hole. For example, the burring portion is disposed at an end portion of the strength-reinforcing member.

The chassis includes aluminum, and the strength-reinforcing member includes a stainless material. A thickness of the strength-reinforcing member is about 0.2 mm to about 0.4 mm.

Furthermore, the mold frame includes a recessed portion that is recessed by a predetermined distance and corresponds to the strength-reinforcing member. The mold frame includes a combining recess, into which the burring portion is inserted. Furthermore, the mold frame includes a hook to be combined with the chassis. The chassis includes a combining hole for receiving the hook. The strength-reinforcing member includes an opening corresponding to the hook and the combining hole. Furthermore, the LCD apparatus further comprises an adhesive, such as double-sided adhesive tape., combining the strength-reinforcing member with the first side portion of the chassis.

Furthermore, the LCD apparatus comprises a backlight unit received by the mold frame., wherein the backlight unit includes a tamp generating a light, a light-guiding plate disposed adjacent to the tamp to guide the light to the LCD panel, a reflective sheet disposed below the light-guiding plate and at least one optical sheet disposed above the light-guiding plate.

An LCD apparatus, according to an embodiment of the present invention, comprises an LCD panel for displaying an image, a mold frame receiving the liquid crystal display panel, a chassis that is combined with the mold frame to secure the LCD panel, wherein the chassis comprises a side portion, and a strength-reinforcing member disposed between the side portion of the chassis and the mold frame.

The strength-reinforcing member including a stainless material is disposed between a side portion of the chassis and the mold frame and may correspond to a whole side surface area of the first side portion of the chassis. As a result, strength of the chassis is reinforced and the LCD panel is prevented from being damaged.

BRIEF DESCRIPTION OF THE DRAWINGS

Exemplary embodiments of the present invention can be understood in more detail from the following descriptions taken in conjunction with the accompanying drawings wherein.

DESCRIPTION OF THE EMBODIMENTS

Exemplary embodiments of the present invention are described more fully hereinafter with reference to the accompanying drawings. This invention may, however, be embodied in many different forms and should not be construed as limited to the embodiments set forth herein.

It will be understood that when an element or layer is referred to as being "on," "connected to" or "coupled to" another element or layer, it can be directly on, connected or coupled to the other element or layer or intervening elements or layers may be present.

Figure 1:
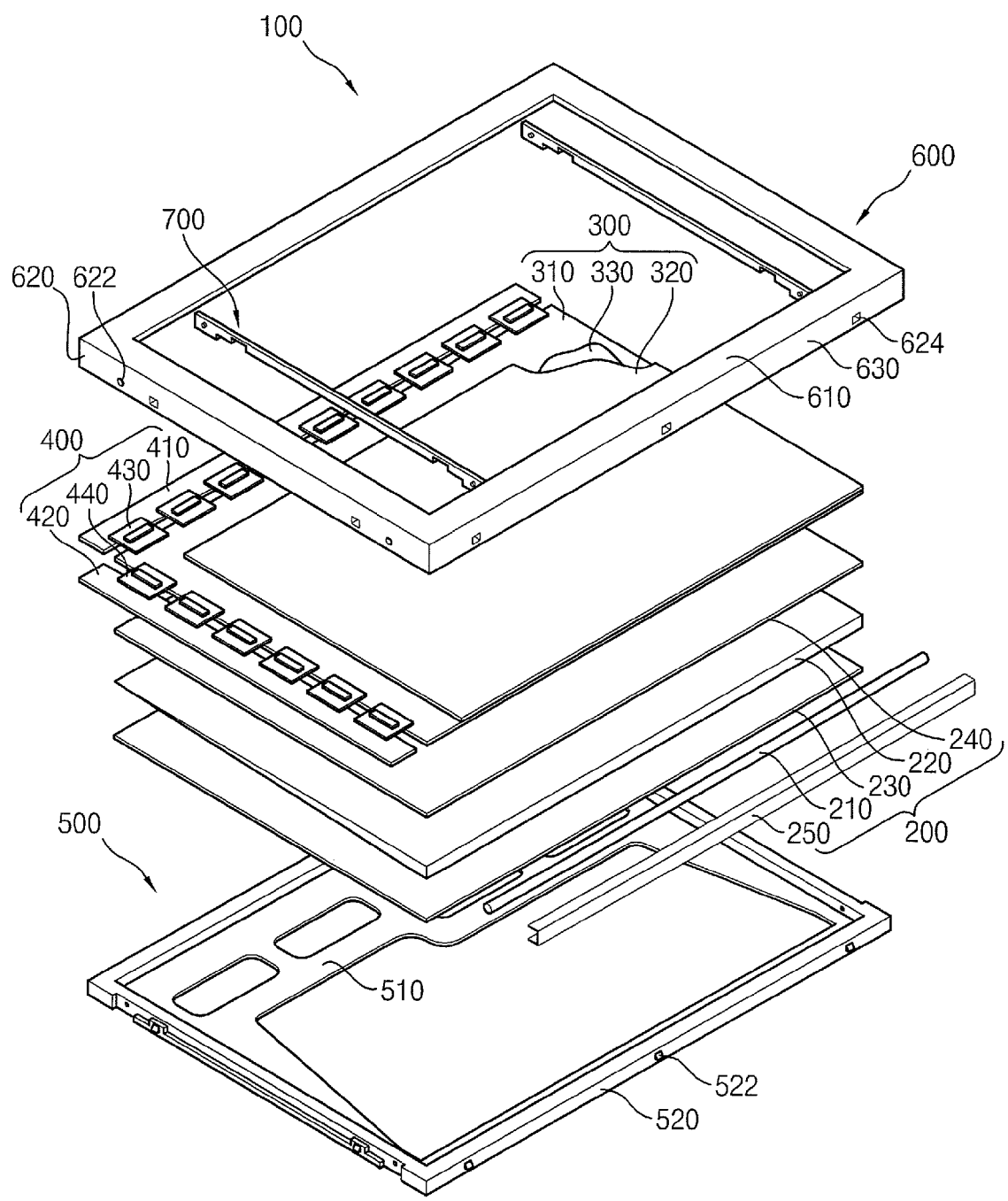
FIG. 1 is an exploded perspective view illustrating a liquid crystal display apparatus according to an embodiment of the present invention.

FIG. 1 is an exploded perspective view illustrating a liquid crystal display (LCD) apparatus according to an embodiment of the present invention.

Referring to FIG. 1, an LCD apparatus 100 includes a backlight unit 200, an LCD panel 300, a mold frame 500, a top chassis 600 and a strength-reinforcing member 700.

The backlight unit 200 includes a lamp 210 generating light, a light-guiding plate 220 to guide the light to the LCD panel 300, a reflective sheet 230 disposed below the light-guiding plate 220 and at least one optical sheet 240 disposed above the light-guiding plate 220.

The lamp 210 generates light in response to a driving voltage applied thereto. The lamp 210 is disposed adjacent to a relatively long side of the light-guiding plate 220. The lamp 210 includes, for example, a cold cathode fluorescent light (CCFL) having a cylindrical shape.

The light-guiding plate 220 guides the light generated by the lamp 210 to the LCD panel 300 disposed on the light-guiding plate 220. The light-guiding plate 220 includes a transparent material capable of transmitting a light, such as polymethyl methacrylate (PMMA).

Referring to FIG. 1 the light-guiding plate 220 may have a wedge-shape such that an end portion close to the lamp 210 is thicker than an end portion away from the lamp 210. The light-guiding plate 220 that has the wedge-shape may be used in a mobile computer, such as a notebook computer. Alternatively, the light-guiding plate 220 may have a plate-shape such that a thickness of the light-guiding plate is uniform.

The reflective sheet 230 reflects a light leaking downward from the light-guiding plate 220 to the LCD panel 300. The reflective sheet 230 includes a material that has a relatively high reflectivity.

The optical sheet 240 may further include a diffusing sheet to diffuse light exiting from the light-guiding plate 220, a prism sheet to condense the light and a reflecting polarizing sheet to improve a light efficiency by transmitting or reflecting the tight according to a polarizing angle of the light.

The backlight unit 200 may further include a lamp cover 250 to protect the tamp 210.

The lamp cover 250 covers the lamp 210, and a portion of the tamp cover 250 is open. A reflective film is disposed at an inner surface of the lamp cover 250 to prevent light generated by the lamp 210 from being lost so that the light exits through the open portion of the lamp cover 250.

The LCD panel 300 is disposed above the backlight unit 200 to display an image. The LCD panel 300 includes a first substrate 310, a second substrate 320 and a liquid crystal layer 330.

The first substrate 310 may be a thin-film transistor (TFT) substrate having a plurality of TFTs, acting as switching elements, arranged in a matrix configuration. The second substrate 320 may be a color filter substrate having red, green and blue (RGB) pixels formed in a thin-film form. The liquid crystal layer 330 includes liquid crystal molecules interposed between the first substrate 310 and the second substrate 320. The liquid crystal molecules have a characteristic of birefringence.

The LCD apparatus 100 may further include a driving circuit part 400 to operate the LCD panel 300.

The driving circuit part 400 includes a data printed circuit board 410 providing the LCD panel 300 with data driving signals, a gate printed circuit board 420 providing the LCD panel 300 with gate driving signals, a data driving circuit film 430 electrically connecting the data printed circuit board 410 to the LCD panel 300 and a gate driving circuit film 440 electrically connecting the gate printed circuit board 420 to the LCD panel 300. The gate printed circuit board 420 may be omitted.

The mold frame 500 receives the backlight unit 200 and the LCD panel 300. The mold frame 500 includes a bottom surface 510 and sidewalls 520 extending from the bottom 510 in a vertical direction. The bottom surface 510 is partially open to reduce weight thereof. Alternatively, the bottom surface 510 may be closed and have a plate-shape. The mold frame 500 may include a resin material and be manufactured by using a mold.

Furthermore, hooks 522 are formed at the sidewalls 520 of the mold frame 500. The hooks 522 are used to combine the mold frame 500 with the top chassis 600. The hooks 522 are formed at an outer side surface of the sidewall 520. The hooks 522 to are spaced apart from each other by a predetermined distance.

The top chassis 600 is combined with the mold frame 500. The top chassis 600 includes an upper portion 610 securing an edge of the LCD panel 300, a first side portion 620 and a second side portion 630 longer than the first side portion. The side portions extend from the upper portion 610 in a vertical direction. The top chassis 600 defines an outer shape of the LCD apparatus and prevents components of the LCD apparatus from being deviated outward. The upper portion 610 of the top chassis 600 includes an opening formed at a central portion of the upper portion 610 so that the image displayed by the LCD panel 300 can be viewed by a user.

A coupling hole 622 is formed at the first side portion 620 of the top chassis 600. The coupling hole 622 is formed at the first side portion of the top chassis 600. The LCD apparatus 100 is covered by an external case.

Combining holes 624 combined with the hooks 522 of the mold frame 500 are formed at the first and second side portions 620, 630 of the top chassis 600. The combining holes 624 are spaced apart from each other by a predetermined distance.

The top chassis 600 includes aluminum to reduce weight of the LCD apparatus 100. For example, a density of the aluminum is about one-third of a density of stainless steel. Particularly, the density of aluminum is about 2.7 kg/cm$^2$, and the density of stainless steel is about 8.0 kg/cm$^2$. Furthermore, a strength of aluminum, which means a tensile strength, is about 21 kg/cm$^2$.

The strength-reinforcing member 700 is disposed adjacent to the first side portion 620 of the top chassis 600, at which the coupling hole 622 is formed. More particularly, the strength-reinforcing member 700 corresponds to a side surface of the first side portion 620 of the top chassis 600.

The strength-reinforcing member 700 includes a stainless material stronger than aluminum. For example, the strength-reinforcing member 700 may include SUS 301 or SUS 304. Alternatively, the strength-reinforcing member 700 may include SUS 316 that has a relatively high rust-resistance. A strength of the SUS 304, which means a tensile strength, is about 52 kg/cm$^2$. The strength of the stainless material is about 49 kg/cm$^2$ to about 55 kg/cm$^2$ according to a kind of the stainless material.

Thus, the strength-reinforcing member 700 includes a stainless material stronger than aluminum, of which the top chassis 600 is comprised, to reinforce the strength of the top chassis 600.

Hereinafter, the strength-reinforcing member 700 will be explained in further detail with reference to FIGS. 2 and 3.

Figure 2:
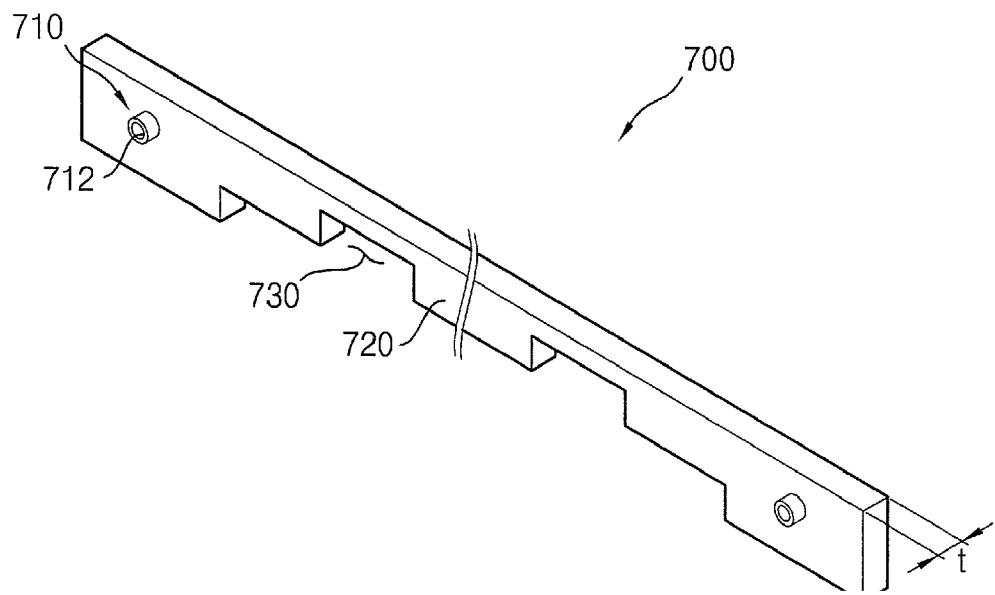
FIG. 2 is a perspective view illustrating a strength-reinforcing member illustrated in FIG. 1 according to an embodiment of the present invention.
Figure 3:
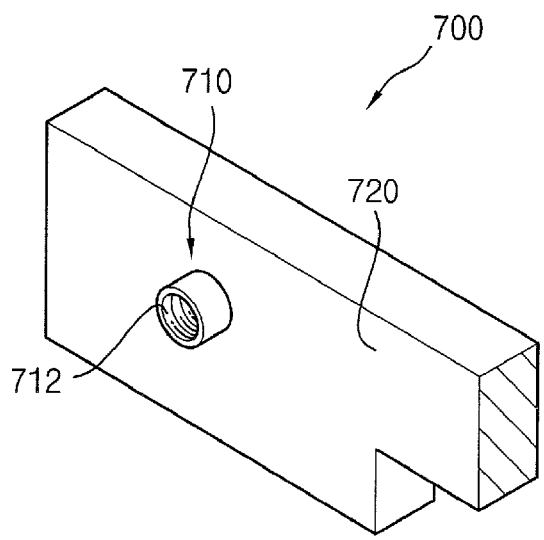
FIG. 3 is an enlarged perspective view illustrating a burring portion of the strength-reinforcing member illustrated in FIG. 2 according to an embodiment of the present invention.

FIG. 2 is a perspective view illustrating the strength-reinforcing member illustrated in FIG. 1. FIG. 3 is an enlarged perspective view illustrating a burring portion of the strength-reinforcing member illustrated in FIG. 2.

Referring to FIGS, 1 to 3, the strength-reinforcing member 700 includes a burring portion 710 corresponding to the coupling hole 622 of the top chassis 600.

The burring portion 710 is formed at an end portion of the strength-reinforcing member 700. The burring portion 710 is formed at a base plate 720 of the strength-reinforcing member 700. A central portion of the base plate 720 is narrower than the end portion of the base plate 720.

The shape of the base plate 720 allows for a relatively light weight by removing portions of the base plate 720. Alternatively, a thickness of the central portion of the base plate 720 may be substantially the same as a thickness of the end portion of the base plate 720.

The base plate 720 is formed by cutting a planar stainless plate. The planar stainless plate may be cut by using an automatic cutting machine to form a base plate having a predetermined shape. Thereafter the base plate is exactly cut by a detail-cutting machine to complete the base plate 720. Alternatively, the base plate 720 may be automatically cut by a general-purpose milling machine to which a desired value is inputted. Since the base plate 720 having a sharp edge may damage an operator, an edge of the base plate 720 is arranged to have a round shape. Alternatively, the base plate 720 may be formed through a molding process.

Furthermore, the base plate 720 is subjected to polishing treatment and gloss treatment to prevent impurities caused by friction.

A thickness of the strength-reinforcing member 700 is about 0.2 mm to about 0.4 mm, and for example, about 0.3 mm, which may be a minimized thickness such that wagging or bending is prevented in view of a width and a length of the base plate 720. Thus, a thickness of the base plate 720 is about 0.2 mm to about 0.4 mm, and for example, about 0.3 mm.

The burring portion 710 has a cylindrical shape having a screw hole 712 formed at a central portion of the burring portion 710. The screw hole 712 includes a threaded portion to receive a screw to combine the member 700 with an external case. The base plate 720 includes an opening corresponding to the screw hole.

A height of the burring portion 710 is about half of a thickness of the sidewall 520 of the mold frame 500. Alternatively, the height of the burring portion 710 may be greater than half of the thickness of the sidewall 520 of the mold frame 500 by a predetermined amount.

The burring portion 710 includes a material substantially the same as the base plate 720. The burring portion 710 may be manufactured separately from the base plate 720 and combined with the base plate 720. More particularly, a stainless pipe having a predetermined external diameter is prepared. Thereafter, the stainless pipe is cut, and a screw thread is formed at a central portion of the stainless pipe by using a tap screw. Thereafter, the burring portion 710 is combined with the base plate 720 through a welding process. For example, the burring portion 710 may be combined with the base plate 720 through an argon welding process.

Alternatively, the burring portion 710 may be formed by deforming a mold for manufacturing the base plate 720. The screw thread of the screw hole 712 of the burring portion 710 is formed by using a tap screw.

The strength-reinforcing member 700 may further include an opening 730 corresponding to a hook 522 and the combining hole 624 in order to prevent interference with a hook combination of the top chassis 600 and a mold frame 500.

Figure 4:
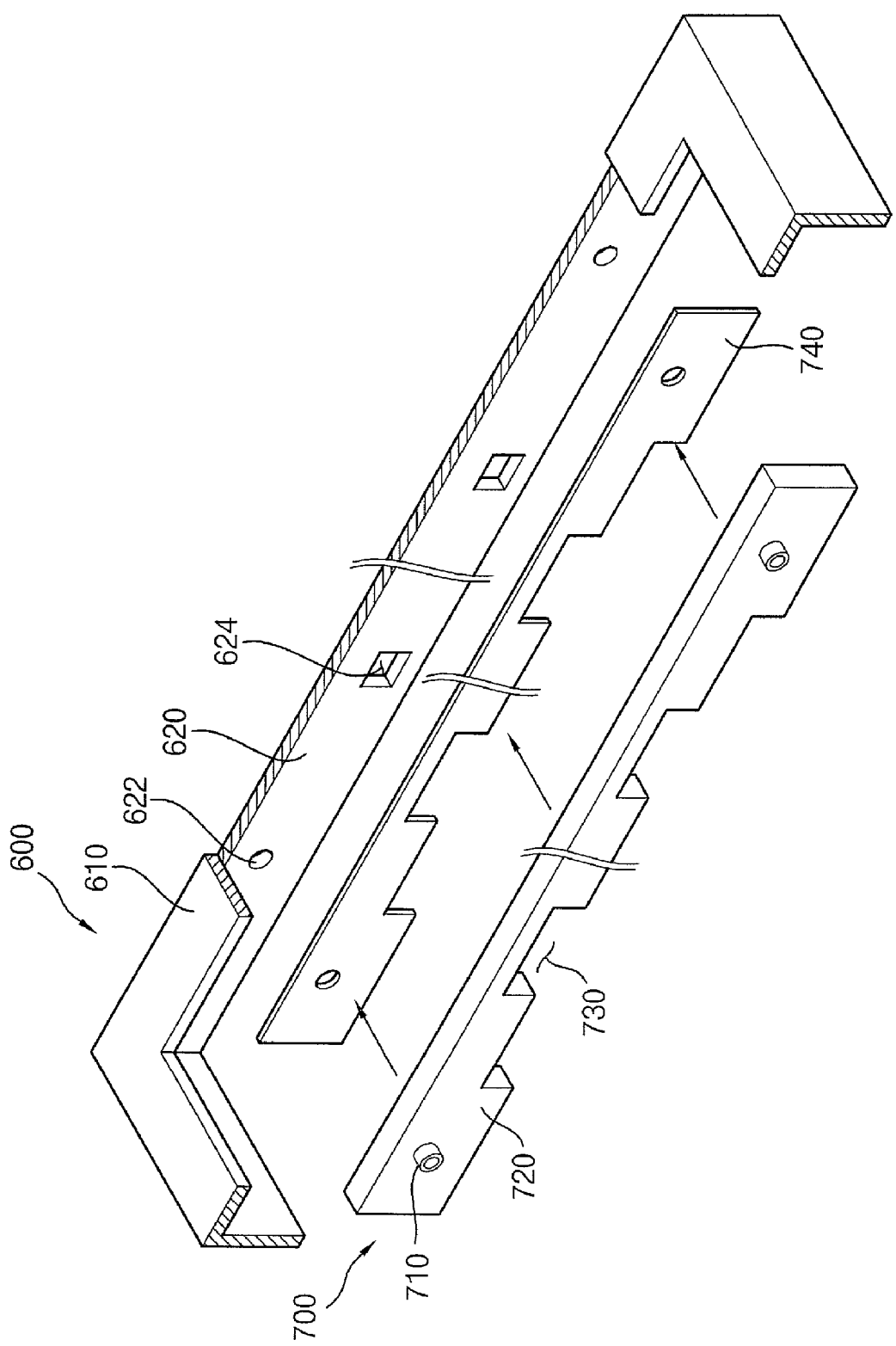
FIG. 4 is a perspective view illustrating the top chassis and the strength-reinforcing member illustrated in FIG. 1 according to an embodiment of the present invention.

FIG. 4 is a perspective view illustrating the top chassis and the strength-reinforcing member illustrated in FIG. 1.

Referring to FIG. 4, the strength-reinforcing member 700 is combined with the first side portion 620 of the top chassis 600.

The strength-reinforcing member 700 is combined with the first side portion by an adhesive, such as, for example, double-sided adhesive tape 740 disposed between the strength-reinforcing member 700 and the first side portion. Alternatively, the to strength-reinforcing member 700 may be combined with the first side portion 620 through a welding process or a revetting process. The double-sided adhesive tape 740 has a shape substantially the same as the shape of the strength-reinforcing member 700 to maximize a force to combine the top chassis 600 with the strength-reinforcing member 700.

A method of combining the strength-reinforcing member 700 with the top chassis 600 includes combining a double-sided adhesive tape with the strength-reinforcing member 700, cutting the double-sided adhesive tape to have a shape substantially the same as the shape of the strength-reinforcing member 700 and combining the double-sided adhesive tape 740 with the top chassis 600. Alternatively., the double-sided adhesive tape may be combined with the top chassis 600 prior to combining with the strength-reinforcing member 700.

The opening 730 of the strength-reinforcing member 700 corresponds to the combining hole 624 in the top chassis 600. A size of the opening 730 is greater than a size of the combining hole 624 by a predetermined amount. Alternatively, the size of the opening 730 may be substantially the same as the size of the combining hole 624.

The opening 730 is formed by cutting the base plate 720. The opening 730 is recessed from a lower portion of the strength-reinforcing member 700. Alternatively, the opening 730 may be recessed from an upper portion of the strength-reinforcing member 700.

The strength-reinforcing member 700 is combined with the first side portion 620 of the top chassis 600 to reinforce the strength of the top chassis 600 including aluminum.

Furthermore, in case that the strength-reinforcing member 700 is applied to a large/medium-screen LCD apparatus, a top chassis including aluminum may be substituted for a conventional top chassis including a stainless material. Thus, a weight of the LCD apparatus may be reduced.

Figure 5:
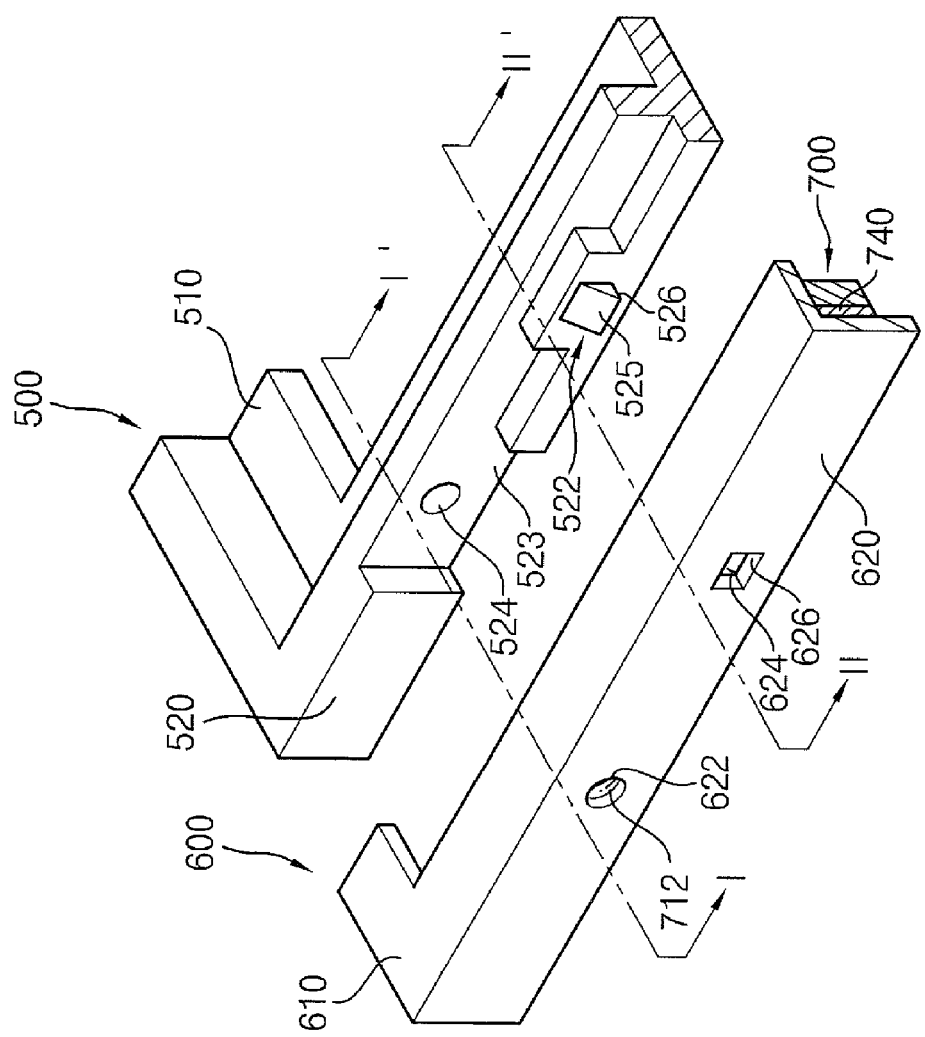
FIG. 5 is a perspective view illustrating the mold frame combined with the top chassis illustrated in FIG. 1 according to an embodiment of the present invention.

FIG. 5 is a perspective view illustrating the mold frame combined with the top chassis illustrated in FIG. 1. FIG, 6 is a cross-sectional view taken along a line I-I' in FIG. 5.

Figure 6:
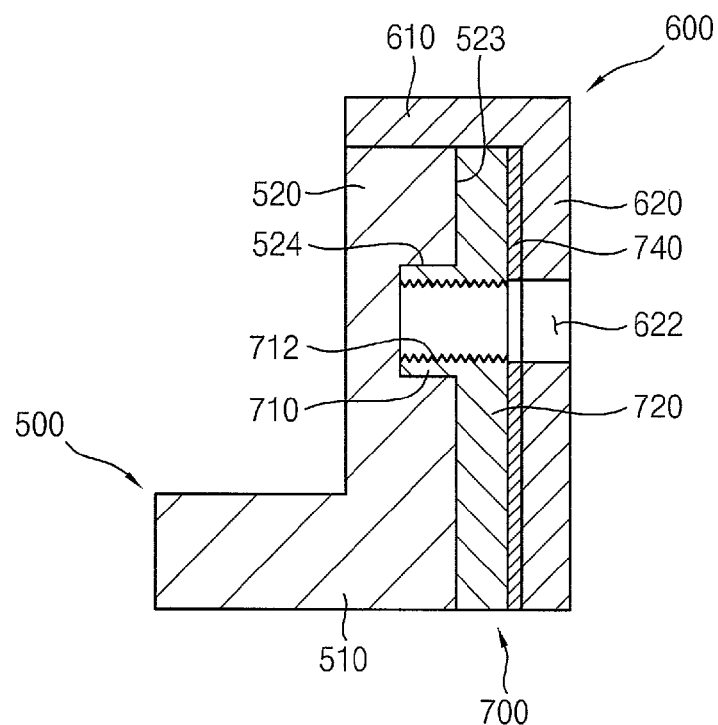
FIG. 6 is a cross-sectional view taken along a line I-I' in FIG. 5 according to an embodiment of the present invention.

Referring to FIGS. 5 and 6, the mold frame 500 includes a recessed portion 523 recessed by a predetermined distance to correspond to the strength-reinforcing member 700.

The recessed portion 523 is formed at an outer surface of the sidewall 520 of the mold frame 500. More particularly, the recessed portion 523 is formed at the sidewall 520 facing the first side portion 620 of the top chassis 600. The recessed portion 523 is recessed by a distance substantially the same as the thickness of the strength-reinforcing member 700. Alternatively, the recessed portion 523 may be recessed by a distance greater than the thickness of the strength-reinforcing member 700 by a predetermined amount.

The recessed portion 523 is formed by deforming a mold for manufacturing the mold frame 500. Alternatively, the recessed portion 523 may be formed by cutting the outer surface of the sidewall 520 of the mold frame 500 by using a cutting machine.

The recessed portion 523 can prevent a size of the LCD panel 100 from being increased by the strength-reinforcing member 700. Furthermore, the recessed portion 523 has a shape substantially the same as the shape of the strength-reinforcing member 700 to secure the strength-reinforcing member 700. Thus, the recessed portion 523 may prevent the strength-reinforcing member 700 from shifting if the combination of the top chassis 600 with the strength-reinforcing member 700 becomes defective.

The strength-reinforcing member 700 does not contact an edge of the LCD panel 300. As a result, the strength-reinforcing member does not damage the LCD panel 300.

The recessed portion 523 may be omitted.

The mold frame 500 includes a combining recess 524 into which the burring portion 710 of the strength-reinforcing member 700 is inserted. The combining recess 524 is formed at the sidewall 520, at which the recessed portion 523 is formed. An internal diameter of the combining recess 524 is substantially the same as the external diameter of the burring portion 710. Alternatively, the internal diameter of the combining recess 524 may be greater than the external diameter of the burring portion 710 by a predetermined amount.

In this embodiment, the combining recess 524 is formed at the recessed portion 523. However, in case that the recessed portion 523 is omitted, the combining recess 524 is formed at the sidewall 520 of the mold frame 520.

Thus, the combining recess 524 provides the burring portion 710 with a space such that the top chassis 600 is prevented from being bent by the burring portion 710. Further, the combining recess 524 is combined with the burring portion 710 so that the combination between the mold frame 500 and the top chassis 600 may be improved.

An additional combining recess may be formed to extend from an end of the combining recess 524, so as to effectively elongate the combining recess 524. A threaded portion is formed at an inner surface of the additional combining recess. Thus, a combining distance is increased so that a combining force increases. In order to form the additional combining recess, the sidewall 520 must be thick enough to accommodate the additional combining recess.

Figure 7:
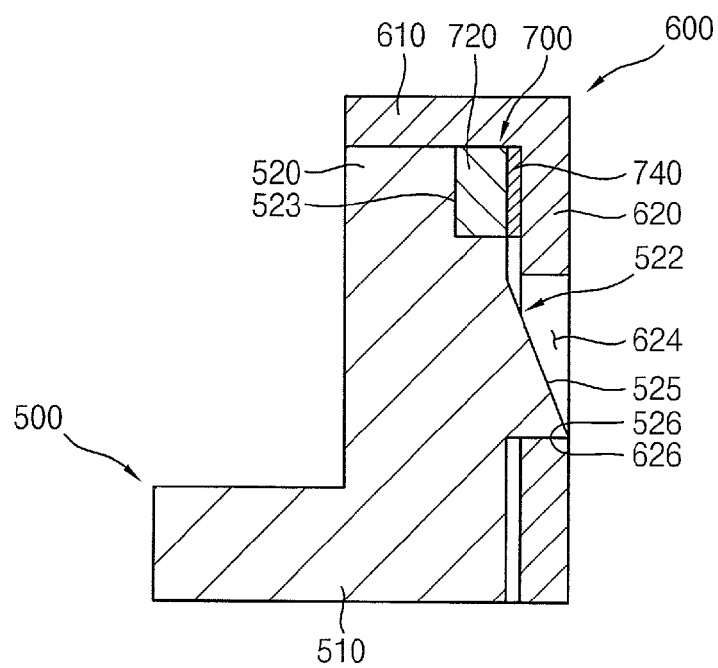
FIG. 7 is a cross-sectional view taken along a line II-II' in FIG. 5 according to an embodiment of the present invention.

FIG. 7 is a cross-sectional view taken along a line II-II' in FIG. 5.

Referring to FIGS. 5 to 7, a hook 522 of the mold frame 500 is inserted into a combining hole 624 of the top chassis 600.

The hook 522 is formed at the sidewall 520 of the mold frame 500. More particularly, the hook 522 is formed at the sidewall 520 of the mold frame 500 to correspond to the opening 730 of the strength-reinforcing member 700.

The hook 522 has a right triangle-shaped cross-section as illustrated in FIG. 7. More particularly, the hook 522 includes a slant surface 525 and a catching surface 526 extending toward the sidewall 520 from a lower end portion of the slant surface 525 such that the sidewall 520 of the mold frame 500 is closer to an upper end portion of the slant surface 525 than to the lower end portion of the slant surface 525.

Referring to FIG. 7, a maximum width of the catching surface 526 in a direction from the lower end portion of the slant surface 525 to the sidewall 520 is substantially the same as the thickness of the top chassis 600. Alternatively, the maximum width of the catching surface 526 may be greater than the thickness of the top chassis 600 by a predetermined distance. The hook 522 is formed by deforming the mold for manufacturing the mold frame 500.

A size of the combining hole 624 corresponds to a size of the hook 522. Alternatively, a width of the combining hole 624, which is in a longitudinal direction of the side portion 620 of the top chassis 600, may be greater than a width of the hook 522 in the direction by a predetermined amount. Thus, the hook 522 may be combined with the combining hole 624.

The combining hole 624 may have various shapes to allow the hook 522 to be inserted into the combining hole 624 without deforming a lower end portion 626 of the combining hole 624. The lower end portion 626 of the combining hole 624 is combined with the hook 522 to cause a combining force.

The hook 522 is combined with the combining hole 624 of the top chassis 600 so that the mold frame 500 is combined with the top chassis 600. During a process of assembling the LCD apparatus, the side portion 620 of the top chassis 600 slides along the slant surface 525, and the hook 522 is completely inserted into the combining hole 624 when the lower end portion 626 contacts the catching surface 526. Thus, the mold frame 500 is combined with the top chassis 600.

Therefore, the mold frame 500 is combined with the top chassis 600 without interfering with the strength-reinforcing member 700 so that a combining force between the mold frame 500 and the top chassis may be prevented from being decreased.

The strength-reinforcing member is disposed between the mold frame and the side portion of the top chassis. Thus, the strength of the top chassis is reinforced. Since the strength-reinforcing member does not make contact with the liquid crystal display panel, the liquid crystal display panel is prevented from being damaged. As to shown in FIG. 1, one or more strength-reinforcing members 700 may be used.

In addition to a small screen liquid crystal display apparatus, a large/medium-screen liquid crystal display apparatus such as a monitor of a desktop computer, or a television, which has the strength-reinforcing member, may have a top chassis including aluminum. Thus, a weight of the liquid crystal display apparatus may be reduced.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display (LCD) apparatus comprising:
    an LCD panel for displaying an image;
    a mold frame comprising a side wall to receive the liquid crystal display panel;
    a chassis that is combined with the mold frame to secure an edge of the LCD panel,
    wherein the chassis comprises a first side portion and a coupling hole formed at the first side portion; and
    a strength-reinforcing member disposed between the first side portion of the chassis and the side wall of the mold frame, wherein the strength-reinforcing member is maintained at the side wall of the mold frame without extending beyond the side wall to overlap a top or bottom edge of the mold frame and a portion of the LCD panel.

2. The LCD apparatus of claim 1, wherein the chassis further comprises a second side portion longer than the first side portion, and the strength-reinforcing member corresponds to a surface of the first side portion.

3. The LCD apparatus of claim 2, wherein the strength-reinforcing member comprises a burring portion corresponding to the coupling hole.

4. The LCD apparatus of claim 3, wherein the burring portion is formed at an end portion of the strength-reinforcing member.

5. The LCD apparatus of claim 3, wherein the chassis comprises aluminum, and the strength-reinforcing member comprises a stainless material.

6. The LCD apparatus of claim 5, wherein a thickness of the strength-reinforcing member is about 0.2 mm to about 0.4 mm.

7. The LCD apparatus of claim 3, wherein the mold frame comprises a recessed portion that is recessed by a predetermined distance and corresponds to the strength-reinforcing member.

8. The LCD apparatus of claim 3, wherein the mold frame comprises a combining recess into which the burring portion is inserted.

9. The LCD apparatus of claim 3, wherein the mold frame comprises a hook, and the chassis comprises a combining hole for receiving with the hook.

10. The LCD apparatus of claim 9, wherein the strength-reinforcing member comprises an opening corresponding to the hook and the combining hole.

11. The LCD apparatus of claim 3, further comprising an adhesive combining the strength-reinforcing member with the first side portion.

12. The LCD apparatus of claim 11, wherein the adhesive is a double-sided tape.

13. The LCD apparatus of claim 1, further comprising a backlight unit, wherein the backlight unit comprises:
a lamp generating a light;
a light-guiding unit adjacent to the lamp to guide the light to the LCD panel;
a reflective sheet disposed below the light-guiding unit; and
at least one optical sheet disposed above the light-guiding unit.

14. A liquid crystal display (LCD) apparatus comprising:
an LCD panel for displaying an image;
a mold frame comprising a side wall to receive the liquid crystal display panel;
a chassis that is combined with the mold frame to secure the LCD panel, wherein the chassis comprises a side portion; and
a strength-reinforcing member disposed between the side portion of the chassis and the side wall of the mold frame, wherein the strength-reinforcing member is maintained at the side wall of the mold frame without extending beyond the side wall to overlap a top or bottom edge of the mold frame and a portion of the LCD panel.

15. The LCD apparatus of claim 14, wherein the strength-reinforcing member corresponds to a surface of the side portion.

16. The LCD apparatus of claim 14 wherein the chassis comprises aluminum, and the strength-reinforcing member comprises a stainless material.

17. The LCD apparatus of claim 14, wherein a thickness of the strength-reinforcing member is about 0.2 mm to about 0.4 mm.

18. The LCD apparatus of claim 14, wherein the mold frame comprises a recessed portion that is recessed by a predetermined distance and corresponds to the strength-reinforcing member.

19. The LCD apparatus of claim 14, wherein the mold frame comprises a hook, and the chassis comprises a combining hole for receiving with the hook.

20. The LCD apparatus of claim 19, wherein the strength-reinforcing member comprises an opening corresponding to the hook and the combining hole.

21. The LCD apparatus of claim 14, further comprising an adhesive combining the strength-reinforcing member with the side portion.

* * * * *